US 6,501,015 B2

(12) United States Patent
Maloney et al.

(10) Patent No.: US 6,501,015 B2
(45) Date of Patent: Dec. 31, 2002

(54) VENTED CAP FOR EQUIPMENT PEDESTAL

(75) Inventors: Jerome A. Maloney, Batavia, IL (US); Bisher J. Rayyahin, Chicago, IL (US); Albert McGovern, Naperville, IL (US)

(73) Assignee: Marconi Communications, Inc., Cleveland, OH (US)

( * ) Notice: Subject to any disclaimer, the term of this patent is extended or adjusted under 35 U.S.C. 154(b) by 0 days.

(21) Appl. No.: 09/766,766

(22) Filed: Jan. 22, 2001

(65) Prior Publication Data

US 2002/0096346 A1 Jul. 25, 2002

(51) Int. Cl.⁷ .................................................. H05K 5/00
(52) U.S. Cl. ....................... 174/17 VA; 174/60; 220/3.2
(58) Field of Search ............................. 174/17 VA, 50, 174/38, 37, 17 R, 66, 67, 60; 220/3.2, 3.3, 3.94, 241, 3.5, 3.6, 3.7, 3.8, 402, 4.24, 4.21

(56) References Cited

U.S. PATENT DOCUMENTS

| | | | | |
|---|---|---|---|---|
| 3,872,234 A | * | 3/1975 | Smith | 174/38 |
| 4,307,436 A | * | 12/1981 | Eckart et al. | 174/38 |
| 4,609,126 A | * | 9/1986 | Janda | 174/16.1 |
| 4,631,353 A | * | 12/1986 | Marks | 174/38 |
| 4,661,651 A | * | 4/1987 | Leschinger | 174/38 |
| 4,873,600 A | * | 10/1989 | Vogele | 174/50 |
| 4,875,595 A | * | 10/1989 | Van Valkenburg | 220/1.5 |
| 5,111,362 A | * | 5/1992 | Flamm et al. | 220/4.02 |
| 5,184,279 A | * | 2/1993 | Horn | 174/38 |
| 5,372,453 A | * | 12/1994 | Steele | 174/16.1 |
| 5,384,427 A | * | 1/1995 | Volk et al. | 174/38 |
| 5,848,718 A | * | 12/1998 | Colwell | 220/4.02 |
| 5,886,296 A | * | 3/1999 | Ghorbani et al. | 174/50 |
| 6,095,356 A | * | 8/2000 | Rits | 215/261 |
| D436,101 S | * | 1/2001 | McGovern et al. | D14/240 |
| 6,185,097 B1 | * | 2/2001 | Behl | 361/695 |
| 6,198,041 B1 | * | 3/2001 | Leschinger et al. | 174/38 |
| 6,211,458 B1 | * | 4/2001 | Mitchell et al. | 174/35 R |
| 6,316,722 B1 | * | 11/2001 | Low et al. | 174/38 |

\* cited by examiner

Primary Examiner—Dean A. Reichard
Assistant Examiner—Angel R. Estrada
(74) Attorney, Agent, or Firm—Jones, Day, Reavis & Pogue

(57) ABSTRACT

A vented non-metallic cap for equipment pedestals having high heat generating components is disclosed. The cap is constructed of a plastic base and a plastic top cover with a stainless steel insect screen between these elements. The base includes a central opening to allow the interior of a covered pedestal to vent heated air generated by newer equipment, and yet the appearance of the vented cap is similar to existing metal pedestal top covers, but has far superior thermal performance.

16 Claims, 4 Drawing Sheets

VENTED CAP FOR EQUIPMENT PEDESTAL

FIELD OF THE INVENTION

The present invention relates to a pedestal cap and more particularly to a vented non-metallic cap for a pedestal containing high heat generating components.

DESCRIPTION OF THE RELATED ART

Equipment pedestals such as those used for telecommunications, cable television and the like are well known. See, for example, U.S. Pat. No. 6,198,041 (co-pending application, Ser. No. 09/366,982) and U.S. Pat. No. 4,631,353. The data transmission equipment enclosed in such pedestals generate heat, however, usually this does not create any undue problem because the pedestal is able to radiate and/or conduct the heat to the ambient environment thereby preventing damage to the electronic equipment within the pedestal. However, with new high speed data, video electronics and optical devices, the amount of heat generated has grown and has become a problem. Such equipment may generate heat upwards of 23 watts. It is required that ambient air temperature around optical devices not exceed 65° C. while those devices are operating. Furthermore, this critical temperature is to be achieved using only passive thermal management techniques; actively powered cooling devices may not be specified.

BRIEF SUMMARY OF THE INVENTION

The difficulties arising due to increased heat generation have been overcome by the present invention. What is described here is a vented cap for an outdoor equipment pedestal having an appearance and size similar to existing pedestal top covers and comprising a base having an open center portion and a peripheral vent, a screen mounted to and supported by the base, an impact cover mounted to the base above the screen, and a fastener for connecting the base and the cover.

There are a number of advantages, features and objects achieved with the present invention which are believed not to be available in any earlier related device. For example, one advantage is that the present invention provides a vented pedestal cap having superior thermal performance characteristics compared to existing pedestal top covers. Another object of the present invention is to provide a vented pedestal cap which allows good passive interior ventilation. A further advantage of the present invention is to provide a vented cap that fits existing pedestals from a size standpoint and also has a similar appearance so as not to detract from the pedestal's aesthetics. Still another aspect of the present invention is to provide a vented pedestal cap having good impact resistant qualities. Yet another advantage of the present invention is to provide a vented pedestal cap which is made of several parts that are easily, quickly and inexpensively made and assembled. A further object of the present invention is to provide a vented pedestal cap which is strong, chemical resistant, flame retardant and highly weatherable. An additional aim of the present invention is to provide an insect screen as part of the cap so as to shield the interior of the pedestal from environmental contaminants.

A more complete understanding of the present invention and other objects, advantages, features, aspects and aims thereof will be gained from a consideration of the following description of the preferred embodiment read in conjunction with the accompanying drawing provided herein.

DETAILED DESCRIPTION OF THE INVENTION

Figure 1:
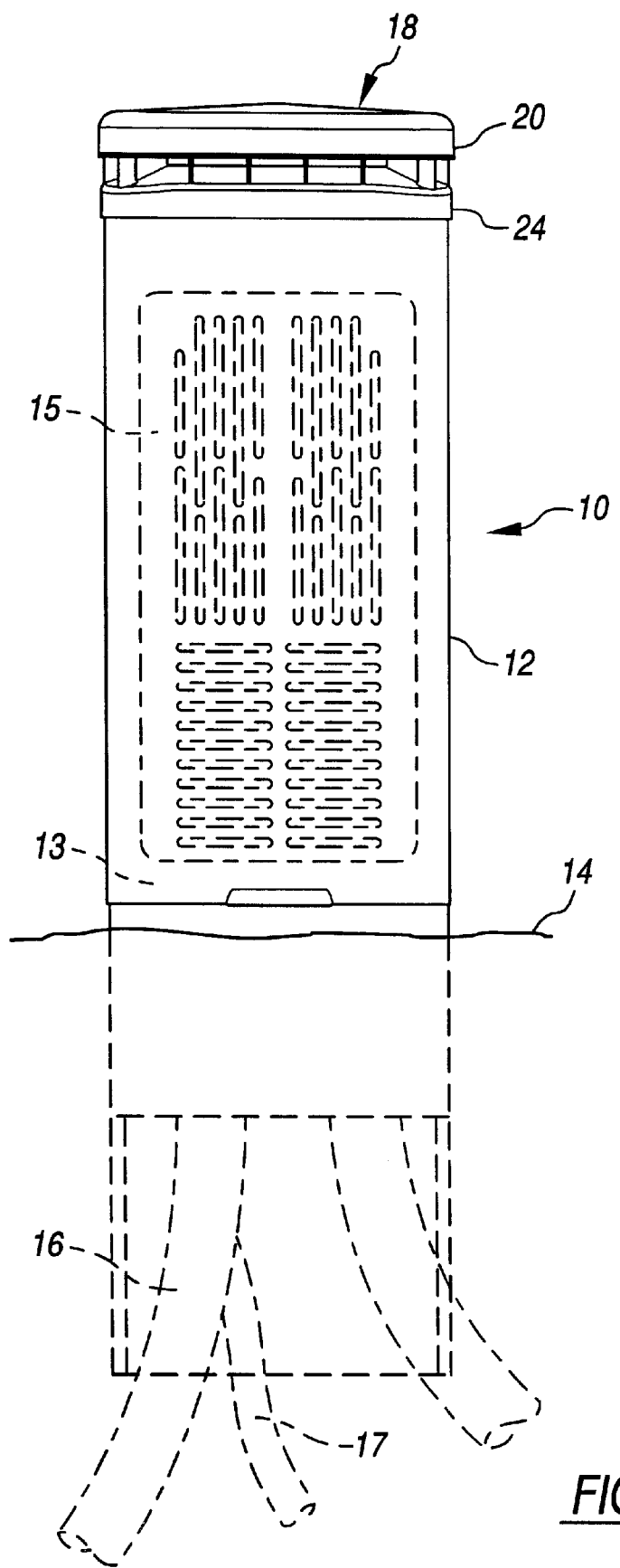
FIG. 1 is a generalized elevation view of an equipment pedestal partially buried underground having the vented cap of the present invention.

While the present invention is open to various modifications and alternative constructions, the preferred embodiment shown in the drawing will be described herein in detail. It is understood, however, that there is no intention to limit the invention to the particular form disclosed. On the contrary, the intention is to cover all modifications, equivalent structures and methods, and alternative constructions falling within the spirit and scope of the invention.

The new cap disclosed herein has much better thermal performance characteristics when compared to existing caps. Even though the cap resembles prior art top covers, the new cap provides for enhanced ventilation while having superior impact resistance, chemical resistance, flame retardation and weather capabilities. Referring now to FIG. 1, there is illustrated a pedestal 10 having a pedestal housing 12 and an interior chamber 13, part of which is located below ground level. Ground level is represented by a wavy line 14. Within the pedestal is a mounting plate 15 for supporting terminal blocks that receive and pass on electronic signals from a cable 16 to a line 17. At the top of the pedestal is the vented cap 18 of the present invention. As mentioned above, new high speed data, video electronics and optical devices need to dissipate considerably more heat than earlier electronics. It is estimated that the new heat range is approximately twenty three watts. To allow existing pedestals to continue to be used to house the new electronics, the new cap of the present invention has been developed.

Figure 2:
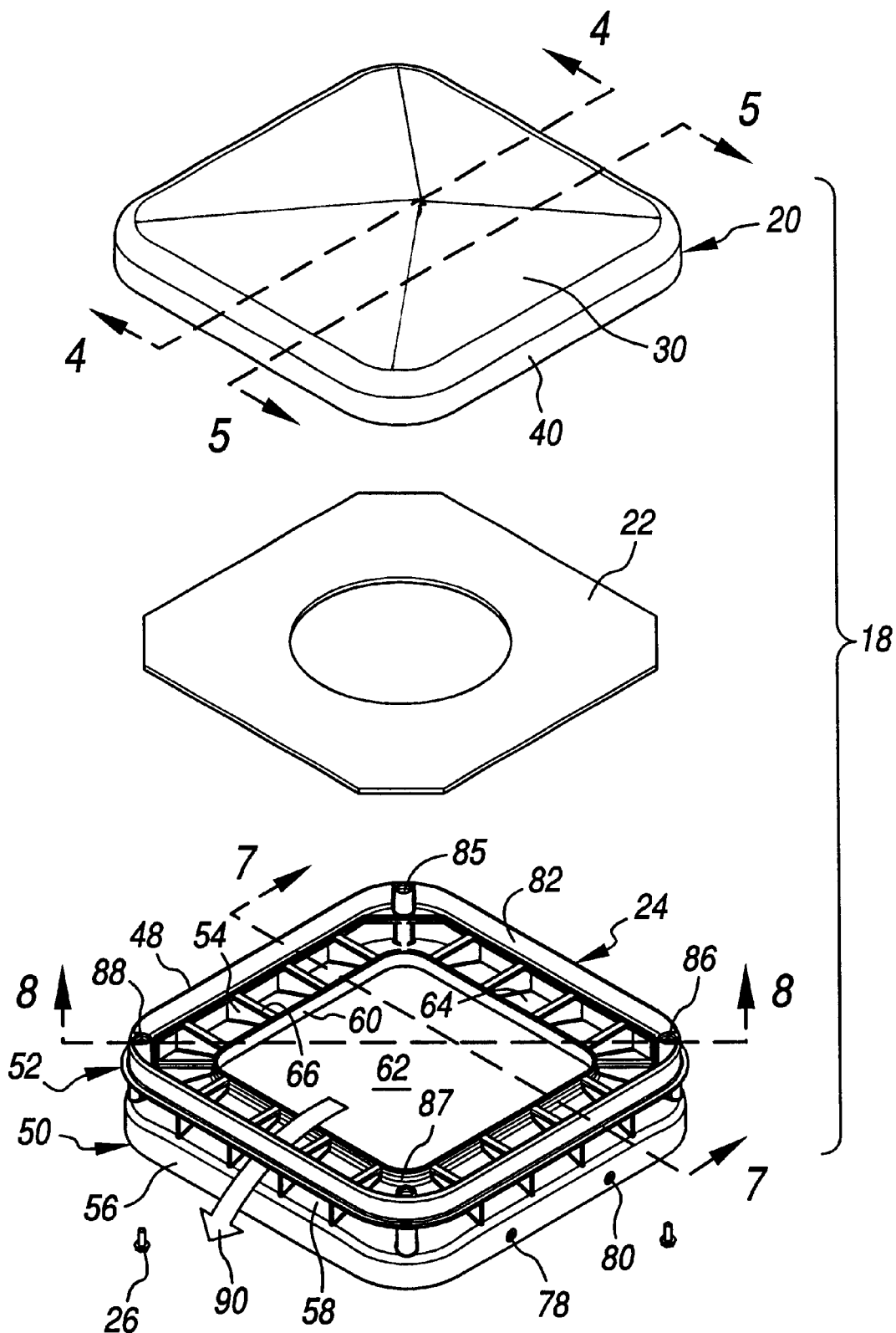
FIG. 2 is an enlarged exploded downward looking isometric view of the three parts of the vented cap of the present invention.
Figure 3:
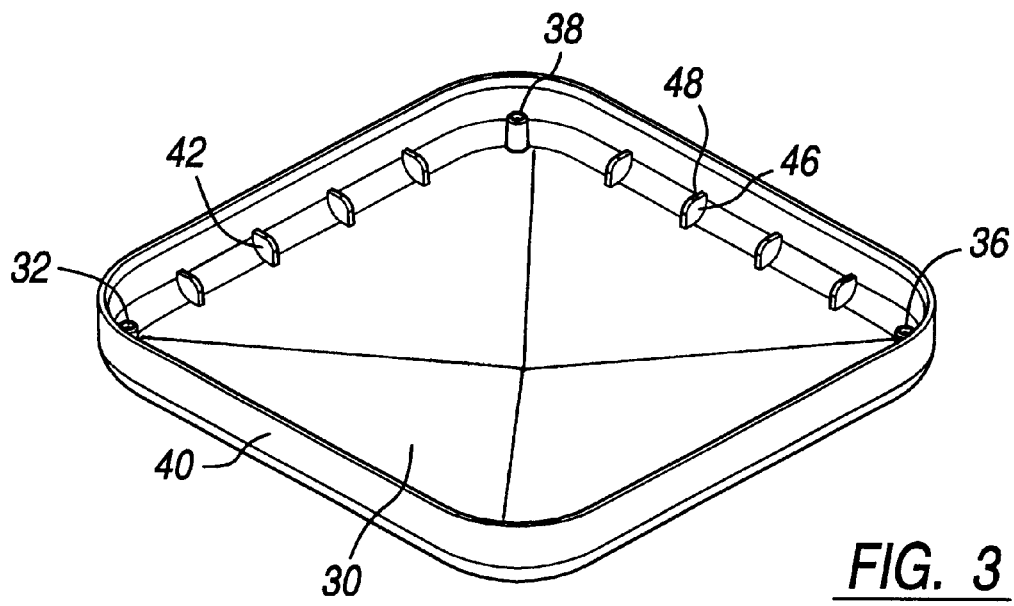
FIG. 3 is an upward looking isometric view of the cover of the vented cap shown in FIGS. 1 and 2.
Figure 4:
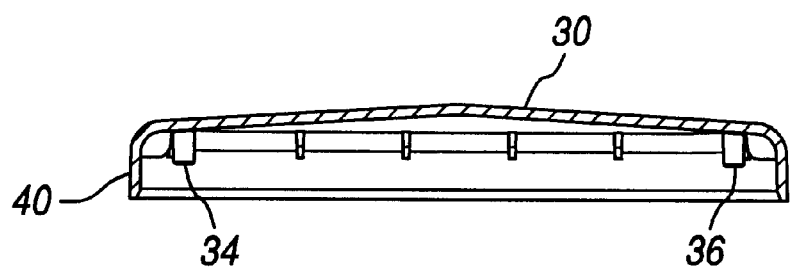
FIG. 4 is a sectional elevation view taken along line 4—4 of the FIG. 2.
Figure 5:
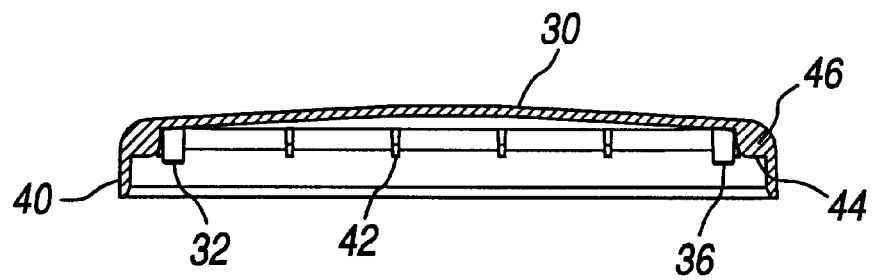
FIG. 5 is a sectional elevation view taken along line 5—5 of FIG. 2.
Figure 6:
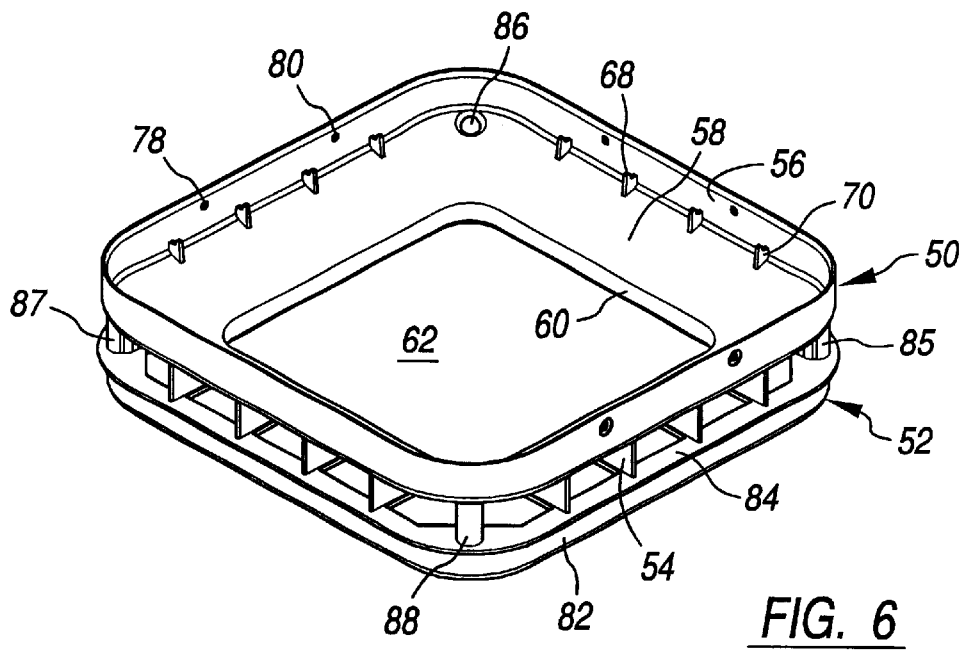
FIG. 6 is an upward looking isometric view of the base of the vented cap shown in FIGS. 1 and 2.
Figure 7:
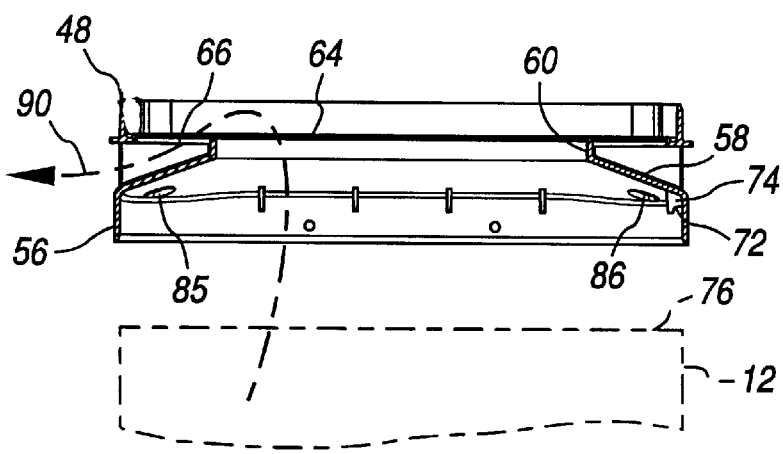
FIG. 7 is a sectional elevation view taken along line 7—7 of FIG. 2.
Figure 8:
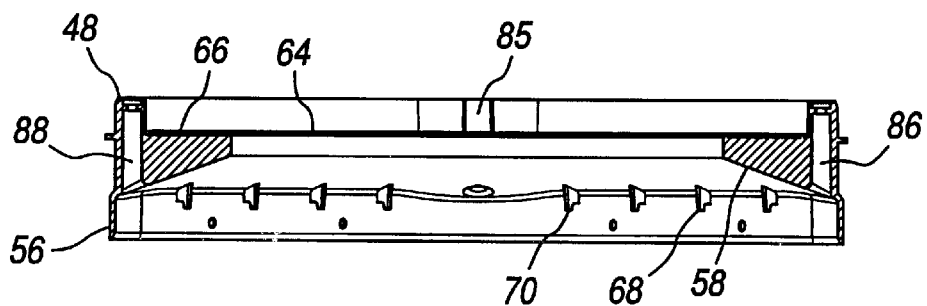
FIG. 8 is a sectional elevation view taken along line 8—8 of FIG. 2.

Referring now to FIG. 2, the vented cap 18 is shown in an exploded view to better appreciate its simplicity. The vented cap includes a top cover 20, an insect screen 22 and a vented base 24. As will be explained below, fasteners, such as the screw 26, pass upwardly through the base 24 to attach to the top cover 20. This forms a compact but aesthetically pleasing vented cap that is quick and easy to make, assemble and install. The cap is also rugged enough to achieve superior impact resistance.

Referring now to FIGS. 2–5, the top cover includes a shallow pyramid shaped top wall 30 fashioned to closely resemble the unvented caps now in prominent use. Under the top wall and at the four corners of the cover, there are screw receiving sleeves, 32, 34, 36, 38. A downward projecting skirt wall 40 is attached to the top wall and a series of support tabs, such as the tab 42, are spaced around the interior of the top cover by the intersection of the skirt wall and the top wall. Each of the support tabs has a bottom edge, such as the edge 44 of the tab 46, for abutting a peripheral edge surface 48, FIG. 2, of the base 24.

The top cover 20 may be made of any suitable material, such as PVC, with an wall thickness of about 0.200 inches. The top cover may be made by injection molding of the entire item so that the top surface, the skirt, the support tabs and the screw receptacles are all integral. The base 24 may also be molded in one piece of PVC resin where the wall thickness is approximately 0.125 inches.

Referring now to FIGS. 2, 6, 7, and 8, the base 24 has a lower peripheral portion 50 and an upper peripheral portion 52. Connecting the lower and upper peripheral portions and spaced around the base periphery are a series of support ribs, such as the rib 54. The lower peripheral portion 50 includes an outer wall 56, a slanted wall 58, and an inner wall 60. The inner wall 60 defines a central opening 62. At the upper portion of the inner wall 60 is a support edge 64. The support edge 64 and the tops of each of the support ribs, such as the rib top edge 66, all lie in a common horizontal plane and they act to support the insect screen 22. At the interior junction of the outer wall 56 and the floor 58 are a series of support tabs, such as the tabs 68, 70. The support tabs of the base each include a slot, such as the slot 72 of the tab 74. These slots receive a top edge 76 of the pedestal housing 12 to support the vented cap. Lateral screw holes, such as the holes 78, 80, are provided to receive screws (not shown) to fasten the vented cap to the walls of the pedestal.

The upper peripheral portion 52 of the base includes a peripheral vertical wall 82 and a border floor 84. The support ribs, such as the rib 54, are connected to the border floor 84 and the inner wall 60. The vertical wall 82 is connected to four corner screw sleeves 85, 86, 87, 88. The vertical wall 82 also surrounds and protects the screen 22 and has the upper peripheral edge surface 48 for supporting the top cover 20.

It can now be seen that a ventilation path is formed from the pedestal chamber through the opening 62, over the edge 64, through the screen 22, above the floor 58 and between the support ribs. This is shown by the curved arrow 90, FIGS. 2 and 7.

The screen 22 is sixteen mesh, 304 stainless steel whose openings are squares of about 0.053 inches per side and with an open area of about seventy-two percent.

To assemble the vented cap, the screen 22 is placed over the support edge 64 of the inner wall 60 and over the top surfaces 66 of the support ribs where it is heat-staked to energy directors. Thereafter, the cover 20 is placed over the peripheral edge 48 of the base. Hi-Lo screws are then received by the corner screw sleeves of the base and the receiving sleeves of the top cover. When the screws are tightened, the vented cap 18 is completely assembled. The ventilation flow path passes through the screen so that venting from the interior of the pedestal is allowed but insects and debris from outside the pedestal are restricted from entering. Further, when the cap is fastened to the pedestal, the Hi-Lo screws are hidden from view and from tampering.

The geometry of the base and the cover enhance impact resistance of the cap and also provides a tight seal over the pedestal. The top cover and base may each be easily molded as integral pieces and assembled easily so as to eliminate any additional insulation. The cap also has an appearance and size of existing pedestal top covers so as to facilitate replacement.

The specification describes in detail one embodiment of the present invention. Other modifications and variations will under the doctrine of equivalents come within the scope of the attached claims. For example, slight dimensional or geometry changes are considered equivalent structures as are different materials. Still other alternatives will also be equivalent as will many new technologies. There is no desire or intention here to limit the application of the doctrine of equivalents.

What is claimed is:

1. A vented cap for an outdoor equipment pedestal, said pedestal having a lower housing portion to be buried at least partially below ground and an upper housing portion mounted on top of said lower housing portion, the upper housing portion having a top end, said vented cap comprising:

a base having a central opening and a peripheral vent for the passage of warm air out of said pedestal, said base being mounted and connected to the top end of said upper housing portion of said pedestal;

a screen mounted to and supported by said base, said screen having a central opening opening which aligns with said central of said base wherein warm air from said pedestal passes upwardly through the central openings of said base and said screen before passing through said screen and said peripheral vent;

a cover mounted to said base and disposed over said screen, said cover for protecting said screen, said base and the top end of said housing portion and for blocking the passage of said warm air; and a fastener for connecting said base and said cover.

2. The apparatus as claimed in claim 1 wherein:

said cover includes support tabs.

3. The apparatus as claimed in claim 1 wherein:

said cover includes support tabs;

said cover includes a shallow pyramidal top surface; and said cover includes corner sleeves for receiving fasteners.

4. The apparatus as claimed in claim 1 wherein:

said base includes a lower peripheral portion and an upper peripheral portion; and said upper peripheral portion supports said screen.

5. The apparatus as claimed in claim 4 wherein:

said base includes support ribs.

6. The apparatus as claimed in claim 4 wherein:

said base includes support ribs between said upper and lower peripheral portions.

7. The apparatus as claimed in claim 4 wherein:

said upper peripheral portion includes a mounting edge surface for said screen.

8. The apparatus as claimed in claim 4 wherein:

said base includes ribs between said upper and lower peripheral portions;

said base includes a mounting surface for said screen;

said base includes four sleeves for receiving fasteners;

said base includes support tabs; and said screen is made of stainless steel.

9. An outdoor pedestal for telephony electronics comprising:

a pedestal housing having an interior space and a top end portion, said housing for outdoor use and having telephone related electronics located in said interior space and connected to said housing;

a strong, impact resistant, flame retardant, chemical resistant and highly weatherable vented cap for optimizing natural venting and for preventing insect entry, said vented cap having a generally rectangular periphery and providing for air flow from said interior space exiting said vented cap along substantially the entire periphery thereof;

said vented cap having a base mounted on said top end portion of said housing, said base being divided into upper and lower portions and providing for said air flow between said upper and lower portions, an insect entry prevention screen mounted to said base in the path of said air flow and a cover connected to said base.

10. An apparatus as claimed in claim 9 wherein:

said vented cap has an appearance and size of existing telephone pedestal top covers and said vented cap fits on said existing telephone pedestals.

11. An apparatus as claimed in claim 9 wherein:

said vented cap provides for an air flow path from said interior space, through a central opening in said lower portion of said base, passed said screen and between said lower and said upper portions of said base along substantially the entire periphery of said base.

12. An apparatus as claimed in claim 11 wherein:

said base includes peripheral support tabs for mounting said vented cap to said outdoor pedestal.

13. An apparatus as claimed in claim 12 wherein:

said base includes a plurality of support ribs between said upper and said lower portions, said ribs for forming air flow openings therebetween.

14. An apparatus as claimed in claim 13 wherein:

said cover includes support tabs for mounting said cover to said base; and said cover includes no opening.

15. A vented cap for an outdoor equipment pedestal comprising:

a base having an open center portion and a peripheral vent;

a screen mounted to and supported by said base;

an impact resistant cover mounted to said base above said screen; and a fastener for connecting said base and said cover together and wherein the base includes a lower peripheral portion and an upper peripheral portion; and said base includes support tabs.

16. The apparatus as claimed in claim 15 wherein:

said base includes support ribs between said upper and lower peripheral portions;

said base includes a mounting surface for said screen;

said base includes four sleeves for receiving fasteners; and said screen is made of stainless steel.

* * * * *